United States Patent
Oyama et al.

(10) Patent No.: US 7,623,253 B1
(45) Date of Patent: Nov. 24, 2009

(54) INDIRECT PROCESSING OF PRINT JOBS

(75) Inventors: Alan J Oyama, Caldwell, ID (US); James S Boyce, Meridian, ID (US); Dale A. Saur, Boise, ID (US); Tracy K Freeman, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/571,946

(22) Filed: May 15, 2000

(51) Int. Cl.
*G06F 15/00* (2006.01)
*G06K 1/00* (2006.01)
*G06K 15/00* (2006.01)

(52) U.S. Cl. .................... 358/1.14; 358/1.13

(58) Field of Classification Search ....... 358/1.11–1.15, 358/1.9, 1.1
See application file for complete search history.

(56) References Cited

U.S. PATENT DOCUMENTS

| | | | | |
|---|---|---|---|---|
| 5,113,355 A | * | 5/1992 | Nomura | 358/1.11 |
| 5,437,024 A | * | 7/1995 | French | 707/10 |
| 5,517,282 A | * | 5/1996 | Yamashita et al. | 399/10 |
| 5,615,015 A | | 3/1997 | Krist et al. | 358/296 |
| 5,619,649 A | | 4/1997 | Kovnat et al. | 395/200 |
| 5,638,497 A | * | 6/1997 | Kimber et al. | 358/1.15 |
| 5,671,246 A | * | 9/1997 | McIntyre | 358/1.16 |
| 5,689,626 A | | 11/1997 | Conley | 395/117 |
| 5,699,494 A | | 12/1997 | Colbert et al. | 395/114 |
| 5,922,054 A | | 7/1999 | Bibayan | 709/302 |
| 6,003,065 A | * | 12/1999 | Yan et al. | 709/201 |
| 6,073,147 A | * | 6/2000 | Chan et al. | 715/542 |
| 6,104,498 A | * | 8/2000 | Shima et al. | 358/1.14 |
| 6,184,996 B1 | * | 2/2001 | Gase | 358/1.15 |
| 6,466,326 B1 | * | 10/2002 | Shima | 358/1.12 |
| 6,512,592 B1 | * | 1/2003 | Simpson et al. | 358/1.15 |
| 6,636,891 B1 | * | 10/2003 | LeClair et al. | 709/208 |

FOREIGN PATENT DOCUMENTS

DE 69416132 T2 7/1994
EP 0886206 12/1998

OTHER PUBLICATIONS

The Hard Copy Observer, Pipeline Coporation, Mar. 1997.*

* cited by examiner

*Primary Examiner*—Douglas Q Tran

(57) ABSTRACT

A system for processing a print job stores the print job on a first device. A pointer is provided to a printing device, which notifies the printing device that the print job is waiting to be processed. The pointer also identifies the name and location of the print job stored on the first device. When the printing device is ready to process the print job, the printing device retrieves the print job from the first device using the pointer. Additionally, the printing device may retrieve a particular font prior to processing the print job.

21 Claims, 6 Drawing Sheets

INDIRECT PROCESSING OF PRINT JOBS

TECHNICAL FIELD

The invention relates to a system for handling print jobs. More particularly, the invention relates to a system for indirectly spooling and processing print jobs by providing a printing device with a pointer to a print job rather than the print job itself.

BACKGROUND

Printers often include one or more storage devices to store print jobs, configuration information, fonts, and various other data. The storage devices may be memory devices, disk drives, or other storage mechanisms. In many printers, the storage devices have a limited amount of storage space. As new printer features are developed and added to printers, more storage space is needed to support the new features, thereby leaving less space for storing or spooling print jobs.

Certain printer features require that an entire print job be sent to the printer and stored on the printer's storage device. One such feature is the "proof-and-hold" printing feature. Using proof-and-hold, a user of the printer may request printing of several copies of a particular print job. Initially, the printer stores the entire print job and prints one "proof" copy of the print job for proof-reading by the user. If the "proof" copy is acceptable, the user presses a particular button on the printer, and the remaining copies of the print job are printed. If the "proof" copy is not acceptable, the user presses a different button on the printer to abort the operation. This feature prevents the printing of multiple copies of a print job that contains errors or that requires revision. Since the proof-and-hold feature requires storage of the entire print job in the printer, this feature cannot be used if the print job is larger than the capacity of the printer's storage device.

Another printer feature provides a secure printing mode. This secure printing mode allows a user to send a print job to the printer and attach a security code, such as a personal identification number (PIN), to the print job. The printer does not print the print job until the user enters the appropriate security code on the keyboard or screen of the printer. This secure printing mode prevents the wrong individual from viewing sensitive or confidential information contained in a print job. As with the proof-and-hold feature discussed above, this secure printing mode requires that the printer is capable of storing the entire print job. If the print job is larger than the printer's storage capacity, then the user cannot take advantage of the secure printing mode feature.

Certain printers are capable of receiving and storing "blank" electronic forms. These "blank" electronic forms are "filled" with data received in a print job from a user. These electronic forms may be updated periodically, which requires downloading new forms to the printer. In a large organization with many printers, a change to a portion of an electronic form may require the downloading of a revised form to hundreds or thousands of printers to replace the previous version of the form. Administering the repeated distribution of revised electronic forms to multiple printers can be both tedious and time-consuming. Furthermore, each electronic form stored on a printer reduces the available storage space on the printer for storing print jobs and other data.

The invention described herein addresses these and other problems by using pointers to print jobs rather than sending the print jobs directly to the printer.

SUMMARY

The present invention sends a pointer to a printing device instead of sending an entire print job to the printing device. The print job itself is stored on a first device. The pointer provides an indication to the printing device that a print job is ready to print and provides a path to the print job as well as the name of the print job. When the printing device is ready to process the print job, the printing device retrieves the print job using the information contained in the pointer. The pointer requires little storage space on the printing device. Since the print job may be significantly larger than the associated pointer stored in the printing device, the print job may be larger than the available storage space in the printing device. However, features such as proof-and-hold printing and secure printing modes will work properly even though the size of the print job exceeds the storage space of the printing device. Only the pointer is required to be stored in the printer to support these features.

According to one aspect of the invention, the print job is generated by a computer workstation and stored on a storage device in the computer workstation.

According to another aspect of the invention, the printing device retrieves a particular font prior to processing the print job.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
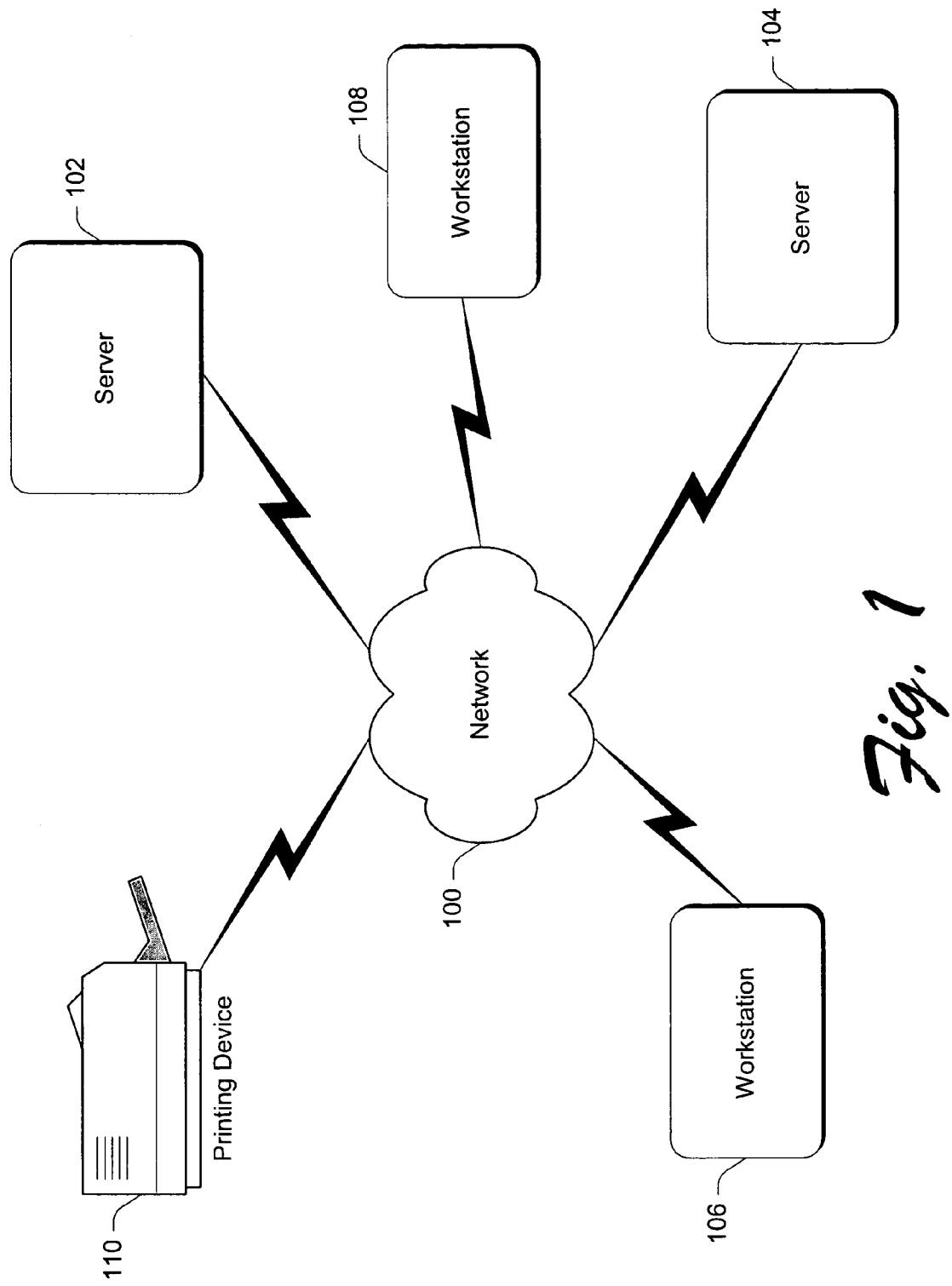
FIG. 1 illustrates a network environment in which multiple servers, multiple workstations, and a printing device are coupled to one another.

FIG. 1 illustrates a network environment in which multiple servers, multiple workstations, and a printing device are coupled to one another via a data communication network 100. The network 100 couples together servers 102 and 104, workstations 106 and 108, and printing device 110. Network 100 can be any type of network, such as a local area network (LAN) or a wide area network (WAN), using any type of network topology and any network communication protocol. Although only a few devices are shown coupled to network 100, a typical network may have tens or hundreds of devices coupled to one another. Furthermore, network 100 may be coupled to one or more other networks, such as the Internet, thereby providing coupling between a greater number of devices.

Servers 102 and 104 may be file servers, email servers, database servers, or any other type of network server. Workstations 106 and 108 can be any type of computing device, such as a personal computer. Printing device 110 is typically a printer, such as a laser printer or an ink-jet printer. Particular examples are discussed herein with reference to printers. However, the teachings of the present invention can be applied to any type of printing device, including all types of printers, copiers, facsimile machines, and multi-purpose devices (i.e., a single device with a combination of printer, copier, and facsimile functions).

Figure 2:
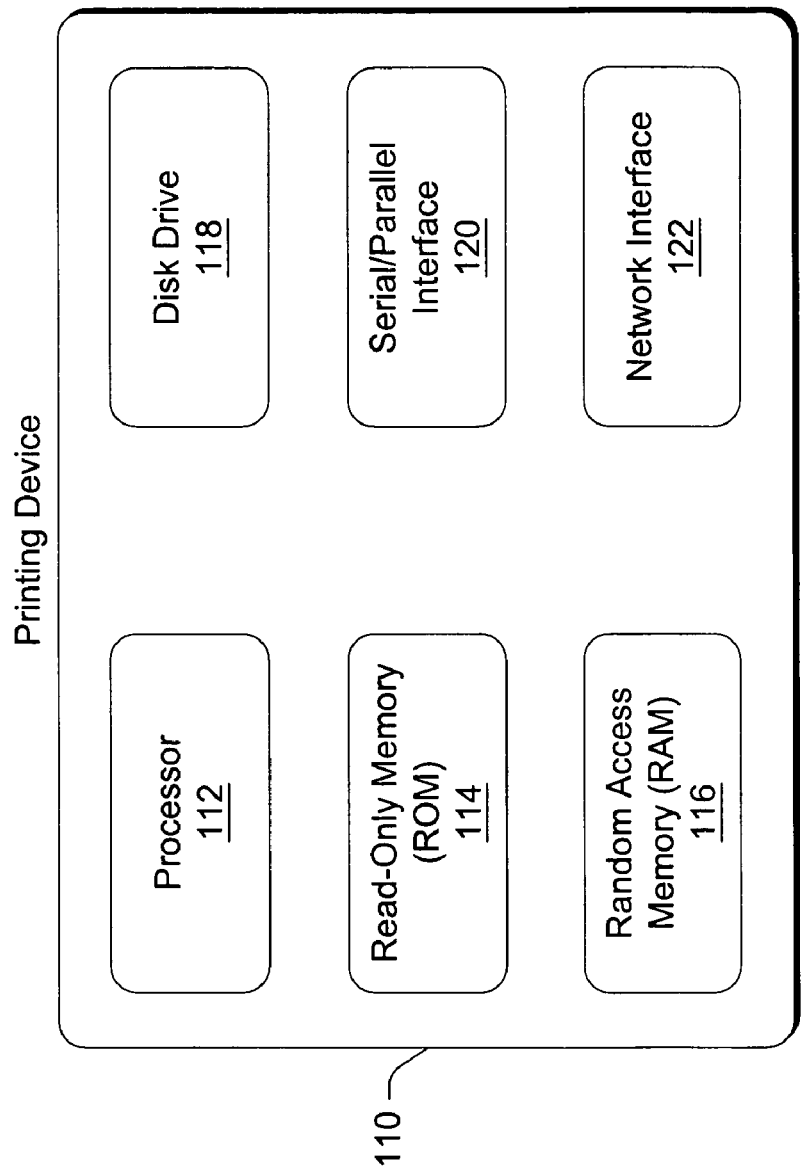
FIG. 2 is a block diagram of a printing device of the type shown in FIG. 1.

FIG. 2 illustrates a printing device 110 of the type shown in FIG. 1. Printing device 110 includes a processor 112, a read-only memory (ROM) 114, and a random access memory (RAM) 116. Printing device 110 also includes a disk drive 118, a serial/parallel interface 120, and a network interface 122. The processor 112 processes instructions and controls the operation of printing device 110. ROM 114 and/or RAM 116 store configuration information, fonts, and other data used to perform various printing and printing control operations. Additionally, RAM 116 may store print job data or pointers to print job data. Disk drive 118 also provides storage for pointers to print jobs, print job data, and other data used by the printing device 110. Although both RAM 116 and disk drive 118 are illustrated in FIG. 2, a particular printing device may contain either RAM 116 or disk drive 118, depending on the storage needs of the printing device. For example, a printing device that stores pointers to print jobs instead of the entire print job itself may not require disk drive 118.

Serial/parallel interface 120 allows printing device 110 to be coupled directly to a workstation, server, or other computing device. Network interface 122 provides a connection between printing device 110 and network 100. The network interface 122 allows servers, workstations, or other computing devices to send pointers to print jobs and print job data to printing device 110 via network 100. Although the printing device 110 shown in FIG. 2 has two interfaces (serial/parallel interface 120 and network interface 122), a particular printing device may only contain one interface.

Figure 3:
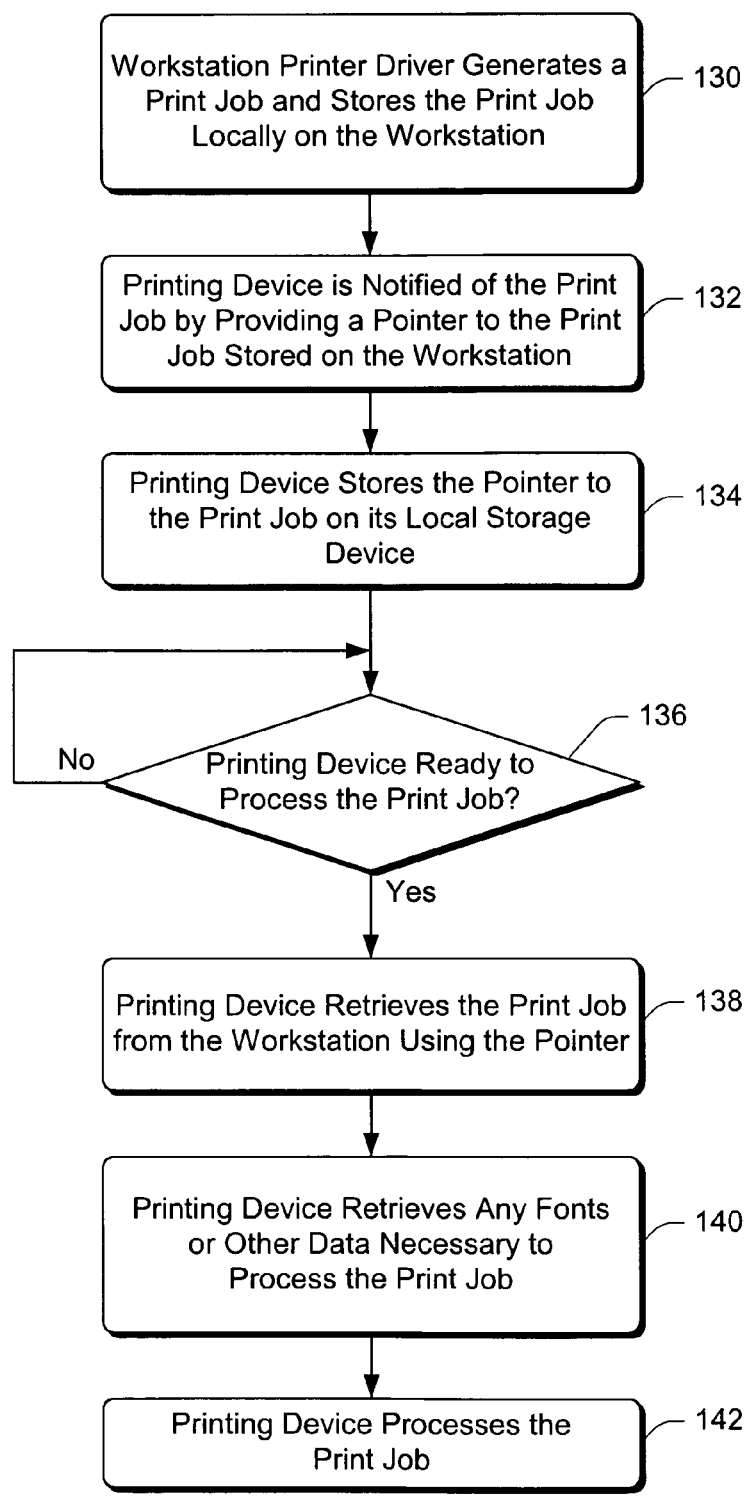
FIG. 3 is a flow diagram illustrating a procedure for indirectly processing a print job.

FIG. 3 is a flow diagram illustrating a procedure for indirectly processing a print job, using the network environment shown in FIG. 1. Initially, a printer driver on a workstation (such as workstation 106 or 108 in FIG. 1) generates a print job and stores the print job locally on a disk drive or other storage device in the workstation (step 130). Next, the printing device that will process the print job is notified of the print job by providing a pointer to the print job stored on the workstation (step 132). The printing device stores the received pointer on its local storage device, such as its disk drive 118 or RAM 116 (step 134). As used herein, "indirect" processing of print jobs refers to the use of one or more pointers that are provided to a printing device instead of communicating the entire print job directly to the printing device. Thus, the processing of the print job is "indirect" in that an intermediate pointer associated with the actual print job is used to identify the print job and indicate to the printing device that a print job is ready for processing.

When the printing device is ready to process the print job (step 136), the printing device retrieves the print job from the workstation using the pointer (step 138). The pointer identifies the path across the network to locate the print job and identifies the name of the print job. In another embodiment of the invention, the printing device "retrieves" the print job by sending a request to the workstation to send the print job to the printing device.

Along with retrieving the print job from the workstation, the printing device also retrieves any fonts, macros or other resource necessary to process the print job (step 140). The fonts, macros, and other data are not necessarily located on the workstation that has stored the print job. Instead, the fonts and other data may be located on different workstations, servers, or printers. For example, the printing device may retrieve one font from a server, another font from another printer, and other document formatting information from another server. After the printing device has retrieved all necessary information and data, the printing device processes the print job (step 142). "Processing" the print job typically refers to printing the print job onto paper or some other medium. However, "processing" may also include displaying the print job on a display device or saving the "processed" or "rendered" image for future retrieval or access by other printing devices (e.g., printing devices that are not capable of rendering the image themselves).

An embodiment of the procedure for providing a print job pointer to a printing device uses PJL (printer job language), which is a printer command language developed by Hewlett-Packard Company of Palo Alto, Calif. An example script using PJL:

@PJL JOB
@PJL FILE="ws2:/home/smith/print_jobs/document.pcl"
@PJL EOJ

In this example script, the first line indicates the beginning of a new print job. The second line is a pointer to the print job. In the example pointer, "ws2:" indicates the device on the network (workstation 2). "/home/smith/print_jobs/" indicates the directory on ws2 in which the print job is located. "document.pcl" indicates the file name of the print job. The ".pcl" extension indicates that the print job is formatted using the printer control language (PCL). PCL is a document description language developed by Hewlett-Packard Company and used in many laser printers and ink-jet printers manufactured by Hewlett Packard Company. The third line of the example script indicates the end of the print job.

In the example script above, additional commands may be entered between the second and third lines to further describe the print job. For example, additional commands may identify one or more fonts to be used when printing the document or may indicate that the print job should be processed using a special processing mode, such as a secure printing mode. In another embodiment of the invention, the commands or instructions for providing a print job pointer to a printing device may be embedded in printer command language itself.

Since the pointer to the print job typically takes significantly less storage space than the associated print job data, less storage space is required in the printer to handle the print job. Additionally, the use of a pointer to a print job allows the printer to process a print job that is larger than the available storage space in the printer. Thus, features such as proof-and-hold and secure printing are available even though the print job is larger than the printer's available storage space.

The use of a pointer to a print job is useful in situations where the processing of the print job is to be delayed until a future time or date. For example, processing of a large print job may be delayed until after regular business hours to avoid network congestion during times of high network usage.

In another example, the pointer may be a uniform resource locator (URL) that identifies a document stored on a web server that is accessible via the Internet. An example script using PJL:

@PJL JOB
@PJL URL="http://www.docsource.com/pcl_docs/document.pcl"
@PJL EOJ

The second line of the script (which contains a "URL" command) indicates that the pointer is a URL that identifies a path and name associated with a particular print job.

In another example, a script file is executed which causes the downloading of a particular file to be printed. An example script using PJL:

@PJL JOB
@PJL EXEC="ws3:/home/smith/print_scripts/document.exe"
@PJL EOJ

In this example, the file "document.exe" contains the code necessary to read in a file (e.g., document.pcl) and perform other operations related to the file, such as recording the date, printer, etc. that is requesting the file. The file is then sent to the printer at the appropriate time.

Figure 4:
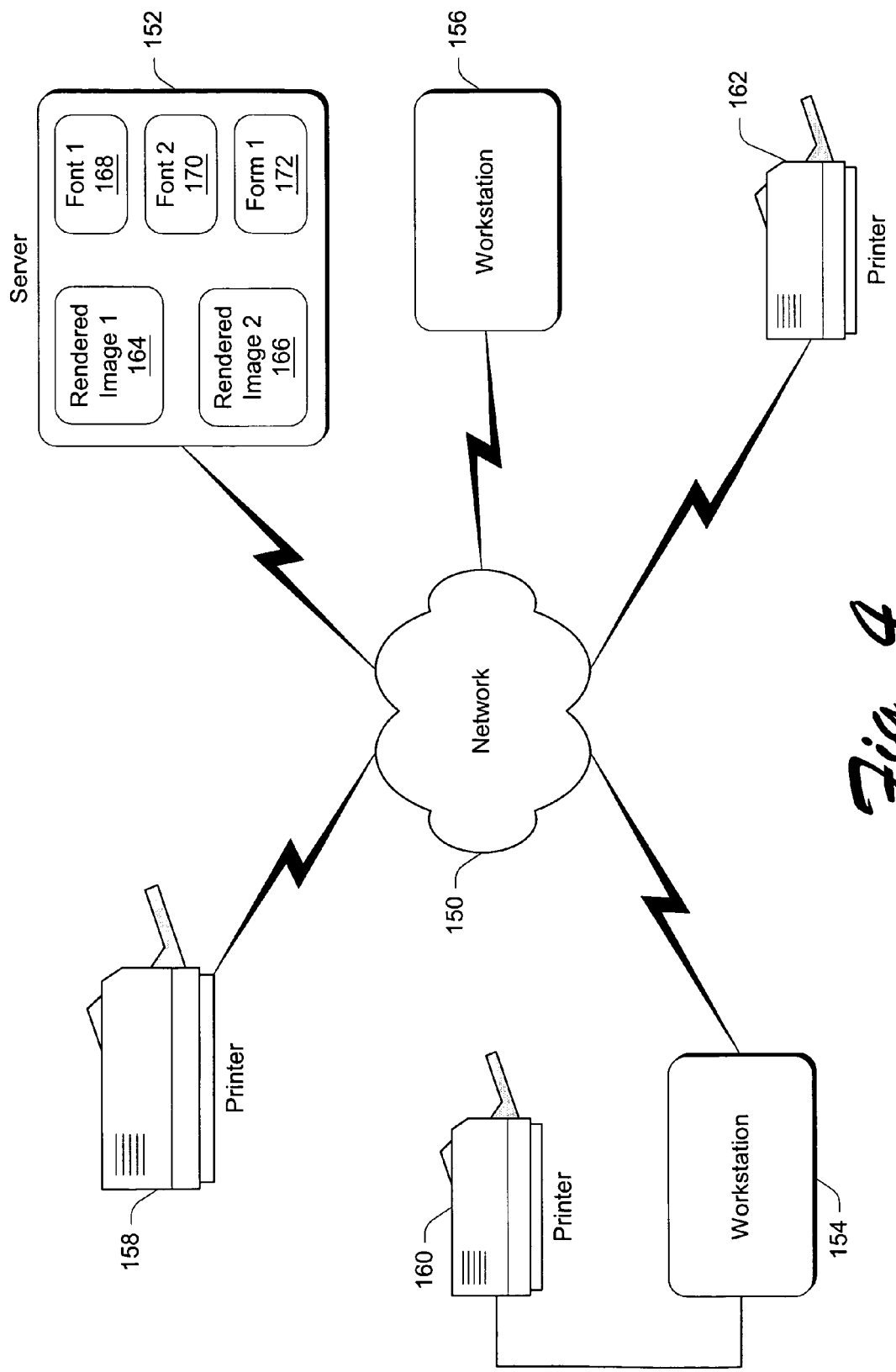
FIG. 4 illustrates another network environment in which a server is coupled to multiple workstations and multiple printing devices.

FIG. 4 illustrates another network environment in which a server is coupled to multiple workstations and multiple printing devices. A data communication network 150 provides a mechanism that couples together a server 152, workstations 154 and 156, and printers 158 and 162. Another printer 160 is coupled to network 150 through workstation 154. Server 152 contains two rendered images 164 and 166, two fonts 168 and 170, and a "blank" electronic form 172, such as an expense report form or a vacation request form. The two rendered images 164 and 166 are print jobs that have already been processed by a printer or other device (such as a workstation) capable of converting print job data into rendered image data.

Fonts 168 and 170 in server 152 are accessed, as needed, by various printers (such as printer 158). Storing a single instance of the fonts 168 and 170 centrally on server 152 reduces the amount of storage space required on the printers because the fonts are downloaded by the printers as needed. When a particular printer is finished with a particular font, the font is deleted from the printer's storage device, thereby releasing storage resources for other fonts, data, or print jobs. Furthermore, the centralized storage of fonts simplifies the upgrading of font data. Instead of repeatedly upgrading a particular font on multiple printers, the single copy of the font stored on server 152 is upgraded. All subsequent uses of the font by a printer will access the upgraded font from server 152.

Similarly, electronic form 172 is accessed by a particular printer as needed, then deleted from the printer when the print job is finished. This centralized storage of the electronic form reduces the storage space used on the printer. Additionally, upgrading the electronic form is simplified because only one instance of the form is upgraded instead of upgrading multiple copies of the form on multiple printers. Although particular examples of fonts and electronic forms are stored in server 152, the teachings of the present invention can be applied to any resource required by a printer to process a print job that does not exist in the print job itself.

Figure 5:
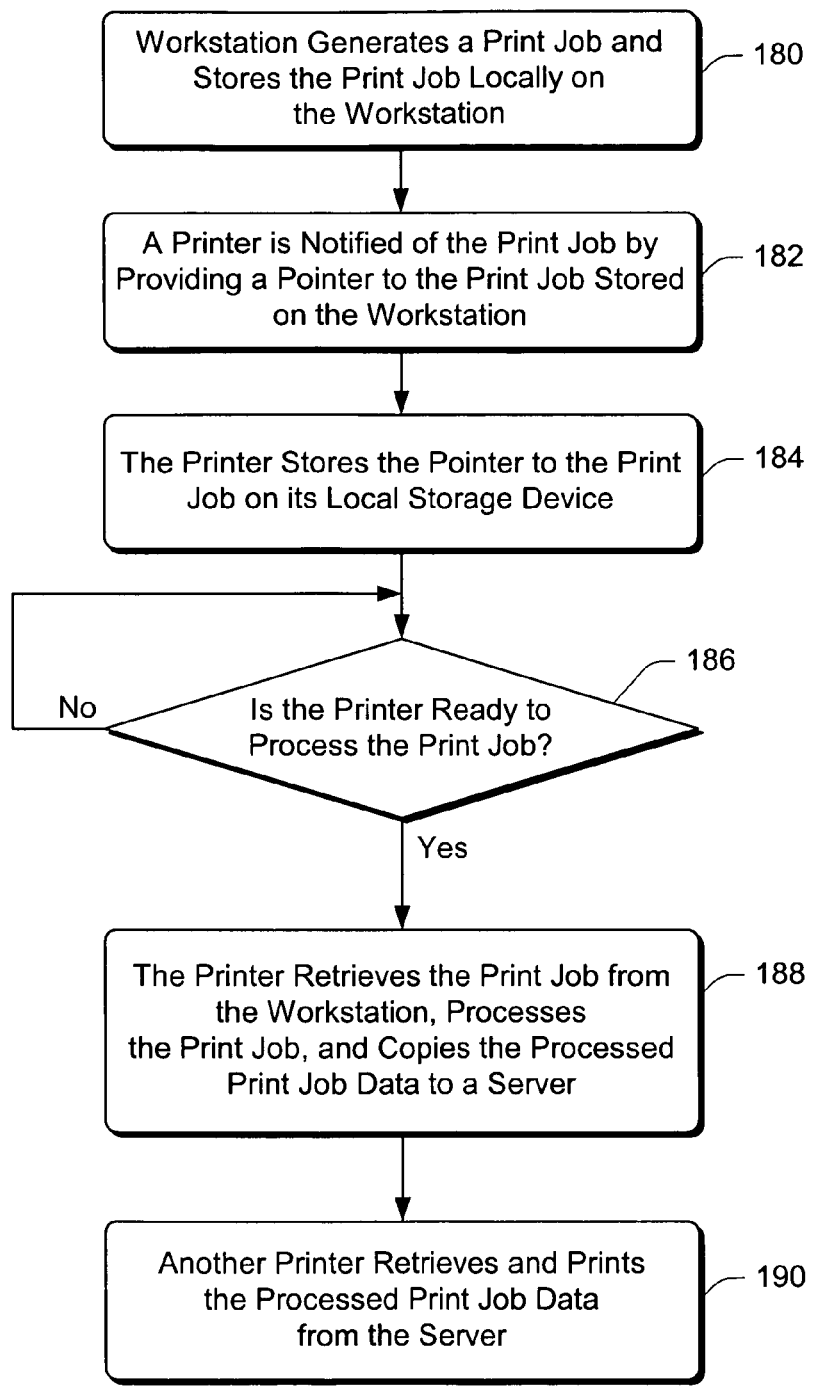
FIG. 5 is a flow diagram illustrating a procedure for processing a print job using the network environment of FIG. 4.

FIG. 5 is a flow diagram illustrating a procedure for processing a print job using the network environment shown in FIG. 4. Initially, a workstation generates a print job and stores the print job locally on the workstation (step 180). A printer is notified of the print job by providing a pointer to the print job stored on the workstation (step 182). The printer stores the pointer to the print job on its local storage device, such as a disk drive or RAM (step 184). When the printer is ready to process the print job (step 186), it retrieves the print job from the workstation (using the pointer), processes the print job, and copies the processed print job data to a server, such as server 152 in FIG. 4 (step 188). The processed print job data is stored as a rendered image file (e.g., rendered image file 164 or 166). This rendered image file can then be retrieved by another printer and printed onto paper or some other medium (step 190). Alternatively, the image may be displayed on a display device or projected onto a viewing surface. The rendered image can be retrieved numerous times by different printers for fast printing. Since the image has already been processed, it can be printed faster than a print job containing raw data that has not been processed.

A particular printer may be used to render an image and then store the image on a server (e.g., server 152 in FIG. 4) or other storage device for later retrieval and printing by any number of printers. An example script using PJL is provided below.

@PJL JOB
@PJL STOREIMAGE="ws3:/home/smith/print_jobs/document.img"
@PJL FILE="ws3:/home/smith/print_jobs/document.pcl"
@PJL EOJ In this example script, the "STOREIMAGE" command identifies the location to which the rendered image (document.img) is stored. The "FILE" command identifies the location of the document (document.pcl) to be read and rendered by the printer. A script such as the one shown below is used to retrieve the rendered image from the server or other storage device.

@PJL JOB
@PJL FILE="ws3:/home/smith/print_jobs/document.img"
@PJL EOJ

This script causes the printer to retrieve the rendered document (document.img) from the server and print the document.

Figure 6:
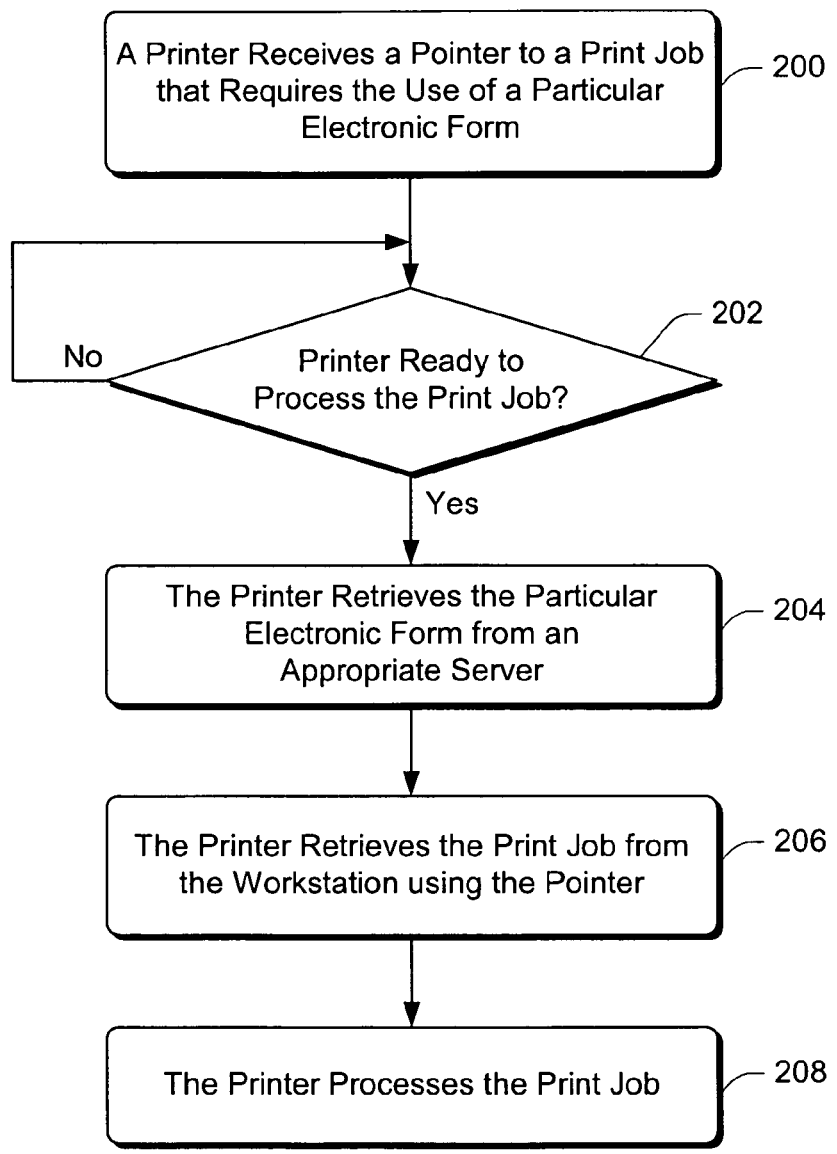
FIG. 6 is a flow diagram illustrating a procedure implemented by a printer for processing a print job using an electronic form.

FIG. 6 is a flow diagram illustrating a procedure implemented by a printer for processing a print job using an electronic form. A printer receives a pointer to a print job that requires the use of a particular electronic form (step 200). The electronic form is identified using, for example, a FILE command that describes the location of the electronic form. Typically, the electronic form is a print job without a formfeed character at the end, which allows additional data to be placed on the form. When the printer is ready to process the print job (step 202), the printer retrieves the particular electronic form from an appropriate server (step 204). Alternatively, the electronic form may be retrieved from a workstation, another printer, or a storage device configured to store electronic forms. Additionally, the printer retrieves any fonts, macros or other data needed to process the print job. The printer then retrieves the print job from the workstation using the pointer (step 206). Using all the retrieved information and data, the printer processes the print job (208). The completed print job is a printed form that contains the appropriate data entered by the user of the workstation. For example, the printed form may be an expense report form containing expense information entered by the workstation user.

Various systems can be used in combination with the present invention to monitor resource usage, such as printer usage, electronic form usage, or font usage. Resource monitoring can be performed, for example, based on usage by an individual user, a group, a department, or an entire company.

This type of resource monitoring can be implemented using an executable script file of the type discussed above. For example, the executable script file reads a file containing usage data, updates the file to include the usage information relating to the current print job, and saves the updated file.

Thus, a system for indirectly processing print jobs has been described herein. The use of a pointer to a print job reduces the storage requirements of a printing device because the pointer requires significantly less storage space than an entire print job. Furthermore, the pointer allows the use of proof-and-hold or secure printing features with print jobs that are larger than the printer's available storage space. The pointer also simplifies the centralized storage of fonts, electronic forms, and other data used repeatedly by one or more printing devices.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of processing a print job, the method comprising:
   storing the print job on a first device;
   generating a pointer associated with the print job;
   providing the pointer to a printing device, wherein the pointer notifies the printing device that the print job is ready to be processed, and wherein the pointer identifies the print job stored on the first device; and
   instructing the printing device to delay printing of the print job until a specified time.

2. A method as recited in claim 1 further including the printing device retrieving the print job using the pointer.

3. A method as recited in claim 1 wherein the first device is a computer workstation that generated the print job.

4. A method as recited in claim 1 wherein the pointer identifies a path to the print job and a name associated with the print job.

5. A method as recited in claim 1 wherein the size of the print job is greater than the storage capacity of the printing device.

6. A method as recited in claim 1 wherein the first device and the printing device are coupled to one another via the Internet.

7. A method as recited in claim 1 wherein the print job is printed in a proof-and-hold mode.

8. A method as recited in claim 1 wherein the print job is printed in a secure printing mode.

9. A method as recited in claim 1 wherein the printing device is a printer.

10. A method as recited in claim 1 wherein the printing device is a laser printer.

11. The method of claim 1, wherein the specified time is a time after regular business hours.

12. A method of processing a print job, the method comprising:
    receiving with a printing device a pointer that identifies a print job on a remote device awaiting processing, wherein the remote device generated the print job;
    receiving with the printing device an identifier that identifies a resource on a remote device necessary to process the print job; and
    if the printing device is available to process the print job, retrieving the print job using the pointer, retrieving the resource using the identifier, and processing the print job on the printing device using the resource.

13. A method as recited in claim 12 further including delaying processing of the print job if a printing device is not available.

14. A method as recited in claim 12 further including monitoring printer usage.

15. A method as recited in claim 12 wherein receiving an identifier comprises receiving an identifier associated with a particular font to be used for the print job.

16. A method as recited in claim 15 wherein retrieving the resource comprises retrieving the particular font using the identifier prior to processing the print job.

17. A method as recited in claim 12 wherein processing the print job includes printing the processed print job data using the printing device.

18. The method of claim 12, wherein the print job and the resource are stored on the same remote device.

19. The method of claim 12, wherein the print job and the resource are stored on separate remote devices.

20. A printing device, comprising:
    means for receiving a pointer that identifies a print job stored on a remote device;
    means for receiving explicit instructions to delay printing of the print job until a specified time;
    means for retrieving the print job using the pointer; and
    means for processing the print job at the specified time.

21. A printing device, comprising:
    means for receiving a pointer that identifies a print job stored on a remote device;
    means for receiving an identifier that identifies a resource stored on a remote device, the resource being necessary to process the print job;
    means for retrieving the print job using the pointer;
    means for retrieving the resource using the identifier; and
    means for processing the print job on the printing device using the resource.

* * * * *